Patented June 7, 1932

1,862,241

UNITED STATES PATENT OFFICE

KARL SCHNITZSPAHN, OF OFFENBACH-ON-THE-MAIN, GERMANY, ASSIGNOR TO GENERAL ANILINE WORKS INC., OF NEW YORK, N. Y., A CORPORATION OF DELAWARE

SOLID PREPARATIONS OF ARYLDIAZONIUM FLUOBORATES YIELDING CONCENTRATED DIAZOSOLUTIONS AND PROCESS OF MAKING SAME

No Drawing. Application filed April 5, 1929, Serial No. 352,896, and in Germany April 3, 1928.

The present invention relates to solid preparations of aryldiazonium fluoborates yielding concentrated diazosolutions and process of making same.

The aryldiazonium fluoborates which were first described in the German Patent No. 281,055 and in Ber. d. Deutsch. Chem. Ges., vol. 60, pages 115 and 1186, show a solubility not in all cases satisfying the demand of the practice when they are employed as developing salts in dyeing and printing, especially for preparing insoluble dyestuffs on the fiber, i. e. the so-called ice-colors. Stronger diazosolutions than those generally obtainable by means of diazonium fluoborates are necessary for the printing process and in the case of dyeing on a standing bath for replenishing the partially exhausted bath.

I have found that by mixing a solid and dry diazonium fluoborate with solid salts of metals of the first or third group of the periodic system the metal of which has a greater affinity for the hydrofluoboric acid than for the acid residue of the salt, whereby in some cases difficultly soluble fluoboric metal salts may be separated, mixtures of a good stability are obtained which yield, when only dissolved in water, diazosolutions of a concentration much higher than corresponding to the solubility of the diazonium fluoborate employed. Suitable salts to be added for the purpose of the present invention are for example aluminium chloride, alkali metal chlorides or salts or double salts of potassium (the acid residue of which forms a more soluble salt with the diazonium compound employed than the fluoborate residue). Besides the just mentioned salts increasing the solubility, other diluents or dyeing expedients may further be present, such as sodium sulfate, aluminium sulfate, cupric sulfate or wetting agents.

The great and unexpected increase of the solubility of the diazonium fluoborates which is effected by my process depends probably upon the fact that the diazonium fluoborates, exceedingly stable in the dry state, undergo easily a double decomposition, when dissolved in the presence of a salt of the aforesaid kind. Thereby in some cases difficultly soluble fluoboric metal salts separate. When a potassium salt is used for this purpose, the double decomposition just mentioned is nearly quantitative and as a further advantage of this case the potassium fluoborate thus separates and may be easily recovered.

In order to further illustrate my invention the following examples are given, the parts being by weight and all temperatures in centigrade degrees, but I wish it to be understood that I am not limited to the particular products nor reaction conditions mentioned therein.

Example 1

26 parts of dry 4-nitro-phenyl-1-diazonium fluoborate are mixed with 39 parts of partially dehydrated alum of 140% relating to a molecular weight of 949. The aqueous solution saturated at 20° of this preparation contains 52,5 grs. of para-nitraniline relating to a molecular weight of 138 per liter in the form of its diazonium salt.

Example 2

60 parts of dry 4-nitro-phenyl-1-diazonium fluoborate, prepared as described in example 2 of the German specification No. 281055 are mixed with 140 parts of sodium chloride. This mixture is introduced at 20° into 600 parts of water. The concentration of the diazo solution thus obtained corresponds to 19,8 grs. para-nitraniline, of molecular weight 138, per liter, whereas the same fluoborate without the addition of sodium chloride yields a concentration of 10,4 grs. of the same base per liter.

By replacing sodium chloride by ammonium chloride diazosolutions are produced the concentration of which corresponds to 22,3 grs. of para-nitraniline per liter.

Example 3

59 parts of the complex boron-fluorine compound prepared from diazotized meta-chloroaniline and sodium fluoborate are mixed with 65 parts of anhydrous sodium sulfate and 65 parts of potassium sulfate. This preparation yields when dissolved in water a diazo solution which contains at 20° the diazo compound of 24,5 grs. of meta-chloroaniline of molecular weight 127,5, per liter, whereas only 11 grs. of meta-chloroaniline, of molecular weight 127,5, per liter can be dissolved at 20° in the form of the diazo compound by starting from an analogous preparation containing no potassium sulfate.

Example 4

39 parts of the fluoborate of tetrazotized dianisidine, the solubility of which corresponds at 20° to 7,5 grs. of dianisidine, of molecular weight 244, per liter, are mixed with 45 parts of dehydrated sodium sulfate and 9 parts of potassium nitrate. The solubility of this preparation in water corresponds at 20° to 45 grs. of the base per liter.

Example 5

11 parts of 3-nitro-phenyl-1-diazonium-fluoborate are mixed with 9 parts of crystallized aluminium chloride and 10 parts of potassium chloride. This mixture is dissolved in water. The saturated solution contains 29,8 grs. meta-nitraniline, of molecular weight 138, per liter in the form of the diazo compound, whereas the same diazonium fluoborate not containing potassium nor aluminium chloride yields only solutions of the diazo compound of 6,5 grs. of meta-nitraniline per liter.

Example 6

50 parts of 3-nitro-phenyl-1-diazonium fluoborate are ground with 40 parts of potassium sulfate and 10 parts of partially dehydrated alum. The concentration of the saturated solution of this preparation corresponds at 20° to 60 grs. of meta-nitraniline, of molecular weight 138, per liter.

I claim:

1. New preparations consisting of a mixture of a solid aryl diazonium fluoborate of the benzene series with diluting salts, dyeing assistants and with a solid salt of a metal of the first group of the periodic system the metal of which has a greater affinity for the hydrofluoboric acid than for the acid residue of the salt.

2. New preparations consisting of a mixture of a solid aryl diazonium fluoborate of the benzene series containing halogen with diluting salts, dyeing assistants and with a solid salt of a metal of the first group of the periodic system the metal of which has a greater affinity for the hydrofluoboric acid than for the acid residue of the salt.

3. New preparations consisting of a mixture of a solid aryl diazonium fluoborate of the benzene series containing nitro groups with diluting salts, dyeing assistants and with a solid salt of a metal of the first group of the periodic system the metal of which has a greater affinity for the hydrofluoboric acid than for the acid residue of the salt.

4. New preparations consisting of a mixture of solid 3-nitro-phenyl-1-diazonium fluoborate with diluting salts, dyeing assistants and with inorganic solid salt of a metal of the first group of the periodic system the metal of which has a greater affinity for the hydrofluoboric acid than for the acid residue of the salt.

5. New preparations consisting of a mixture of solid 3-nitrophenyl-1-diazonium fluoborate with diluting salts, dyeing assistants and with a chloride of a metal of the first group of the periodic system the metal of which has a greater affinity for the hydrofluoboric acid than for the acid residue of the salt.

6. New preparations consisting of a mixture of solid 3-nitrophenyl-1-diazonium fluoborate with diluting salts, dyeing assistants and with potassium chloride.

In testimony whereof, I affix my signature.

KARL SCHNITZSPAHN.